United States Patent
Saila

(10) Patent No.: US 9,338,266 B2
(45) Date of Patent: May 10, 2016

(54) METHOD AND APPARATUS FOR CONTROLLING A MOBILE DEVICE

(75) Inventor: Sami Saila, Halikko (FI)

(73) Assignee: Nokia Technologies Oy, Espoo (FI)

( * ) Notice: Subject to any disclaimer, the term of this patent is extended or adjusted under 35 U.S.C. 154(b) by 79 days.

(21) Appl. No.: 13/995,934

(22) PCT Filed: Nov. 9, 2011

(86) PCT No.: PCT/FI2011/050995
§ 371 (c)(1),
(2), (4) Date: Jul. 26, 2013

(87) PCT Pub. No.: WO2012/089905
PCT Pub. Date: Jul. 5, 2012

(65) Prior Publication Data
US 2014/0295920 A1 Oct. 2, 2014

(30) Foreign Application Priority Data

Dec. 30, 2010 (EP) .................................... 10197372

(51) Int. Cl.
| H04M 1/00 | (2006.01) |
| H04B 1/38 | (2015.01) |
| H04M 1/02 | (2006.01) |
| H04M 1/725 | (2006.01) |

(52) U.S. Cl.
CPC ............ *H04M 1/026* (2013.01); *H04M 1/0208* (2013.01); *H04M 1/0241* (2013.01); *H04M 1/7253* (2013.01)

(58) Field of Classification Search
CPC ............ H04M 1/0214; H04M 1/0227; H04M 1/0233; H04M 1/0241; H04M 1/72519; H04M 1/7253; H04B 2001/3861
USPC ............. 455/90.2, 90.3, 550.1, 575.1, 575.3, 455/575.4; 379/433.01, 433.11, 434
See application file for complete search history.

(56) References Cited

U.S. PATENT DOCUMENTS

| 6,628,974 B1 * | 9/2003 | Lim ..................... H04M 1/0216 379/433.11 |
| 6,748,243 B1 | 6/2004 | Tetsuya et al. |
| 7,099,702 B1 * | 8/2006 | Lundy ........................ 455/575.1 |

(Continued)

FOREIGN PATENT DOCUMENTS

| EP | 1337103 A2 | 8/2003 |
| EP | 1564968 A1 | 8/2005 |

(Continued)

OTHER PUBLICATIONS

International Search Report and Written Opinion received for corresponding Patent Cooperation Treaty Application No. PCT/FI2011/050995, dated Feb. 14, 2012, 13 pages.

(Continued)

*Primary Examiner* — Quochien B Vuong
(74) *Attorney, Agent, or Firm* — Alston & Bird LLP

(57) ABSTRACT

In accordance with an example embodiment of the present invention, an apparatus comprises a housing part and a control part. Said housing part and said control part are configured to be moveable in relation with each other. Said housing part comprises a front surface and said control part comprises a front surface. Said front surface of said housing part and said front surface of said control part are configured next to each other, and the control part is configured to be movable in at least one dimension in relation with said housing part.

16 Claims, 4 Drawing Sheets

(56) References Cited

U.S. PATENT DOCUMENTS

| | | | | |
|---|---|---|---|---|
| 7,117,009 | B2 * | 10/2006 | Wong et al. | 379/433.01 |
| 7,151,911 | B2 * | 12/2006 | Matsumoto | H04M 1/0212 379/433.11 |
| 7,212,846 | B1 * | 5/2007 | Chan | H04M 1/0208 455/575.3 |
| 7,433,722 | B2 * | 10/2008 | Sakamoto et al. | 455/575.3 |
| 7,496,194 | B2 * | 2/2009 | Jeun | H04M 1/0208 455/575.1 |
| 7,551,945 | B2 * | 6/2009 | Okada et al. | 455/550.1 |
| 8,478,366 | B2 * | 7/2013 | Shin et al. | 455/575.1 |
| 8,996,079 | B2 * | 3/2015 | Ahn | 455/575.3 |

FOREIGN PATENT DOCUMENTS

| | | |
|---|---|---|
| EP | 1 617 630 A1 | 1/2006 |
| EP | 1760999 A2 | 3/2007 |
| EP | 1881682 A2 | 1/2008 |
| EP | 1 928 157 A2 | 6/2008 |
| EP | 2 056 600 A1 | 5/2009 |
| EP | 2 192 750 A2 | 6/2010 |

OTHER PUBLICATIONS

Office Action received for corresponding European Patent Application No. 10197372.5, dated Oct. 24, 2014, 5 pages.

Office Action received for corresponding European Patent Application No. 10197372.5, dated Nov. 7, 2013, 5 pages.

Extended European Search Report from European Patent Application No. 10197372.5 dated May 31, 2011.

Office Action from European Patent Application No. 10 197 372.5 dated Jul. 11, 2013.

* cited by examiner

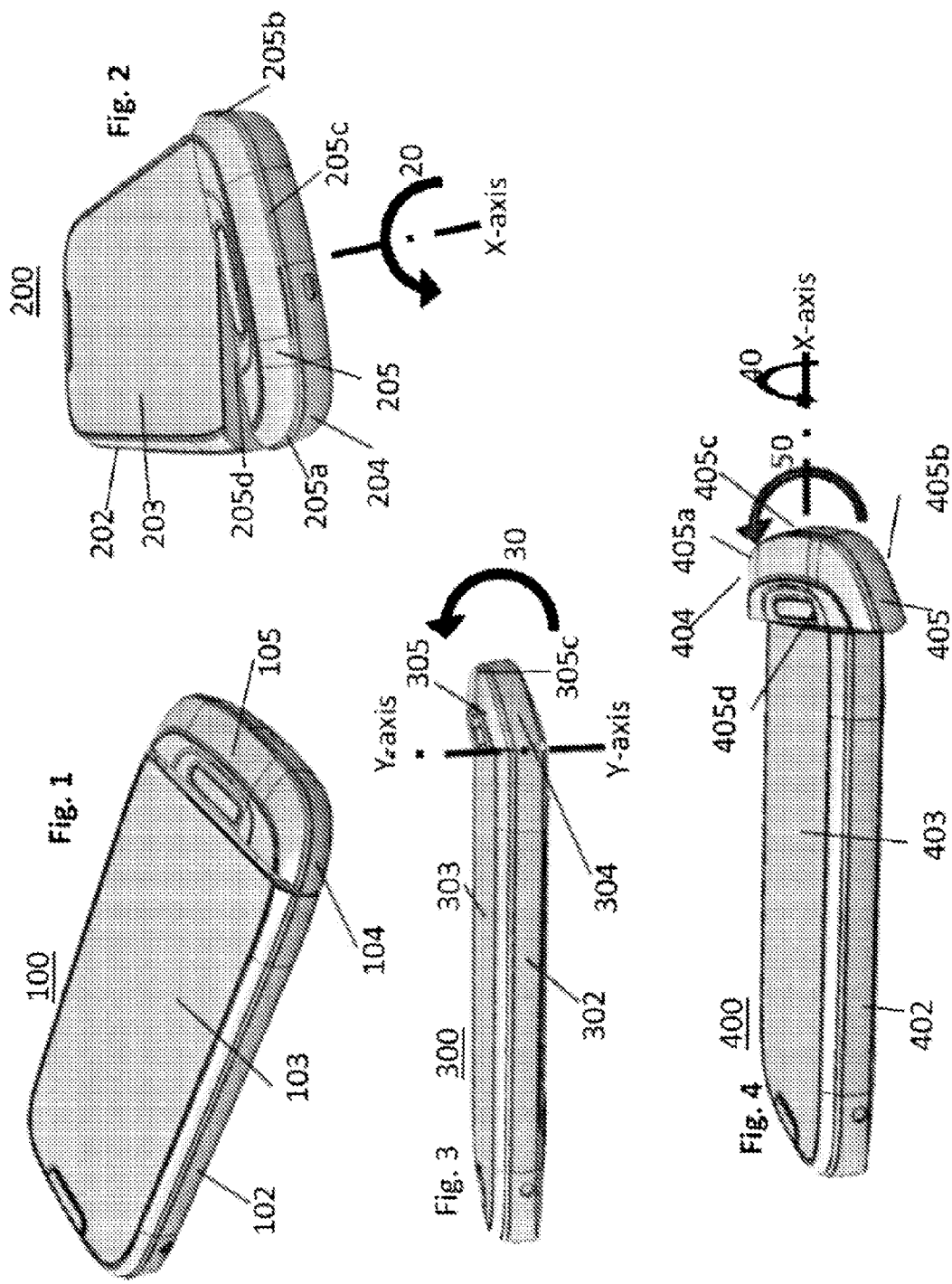

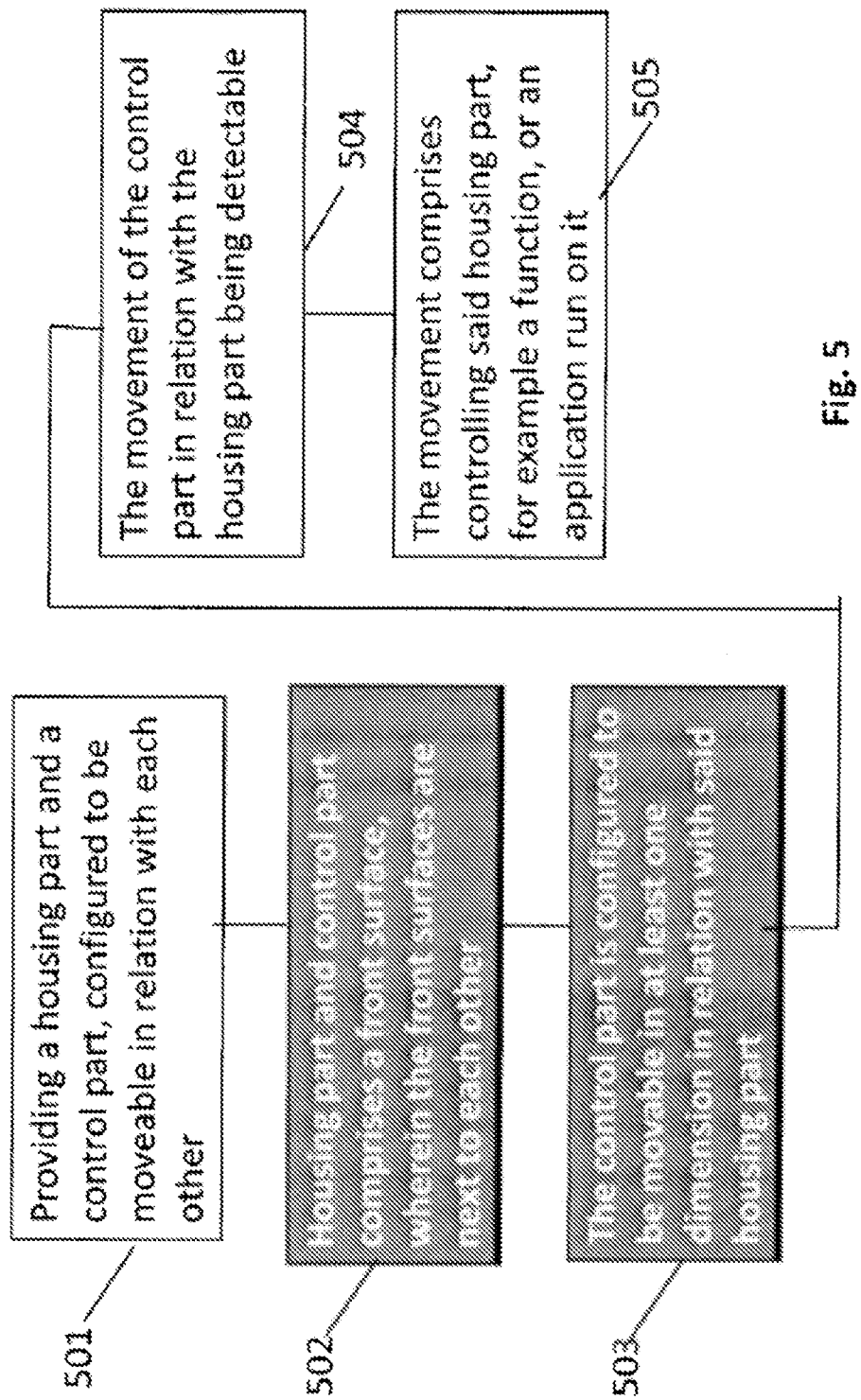

METHOD AND APPARATUS FOR CONTROLLING A MOBILE DEVICE

RELATED APPLICATION

This application was originally filed as Patent Cooperation Treaty Application No. PCT/FI2011/050995 filed Nov. 9, 2011 which claims priority benefit to European Patent Application No. 10197372.5, filed Dec. 30, 2010.

TECHNICAL FIELD

The present application relates generally to method and apparatus for controlling a mobile device.

BACKGROUND

A mobile device may receive input via a key, a keypad, a stick, a mouse or a stylus. Interacting with a mobile device with alternative ways instead of or in addition to using mechanical means or touch screen, may provide new experiences to mobile device users.

SUMMARY

Various aspects of examples of the invention are set out in the claims. According to a first aspect of the present invention, there is an apparatus comprising a housing part and a control part, said housing part and said control part configured to be moveable in relation with each other and said housing part comprising a front surface and said control part comprising a front surface, wherein said front surface of said housing part and said front surface of said control part are configured substantially next to each other and wherein the control part is configured to be movable in at least one dimension in relation with said housing part.

According to a second aspect of the present invention, there is a method comprising providing a housing part and a control part, providing said housing part and said control part to be moveable in relation with each other, providing a front surface of said housing part and a front surface of said control part substantially next to each other, and providing said control part to be movable in at least one dimensions in relation with said housing part.

According to a third aspect of the present invention, there is a computer program, comprising a computer-readable instructions for detecting movement of a control part of an apparatus, and controlling a housing part of the apparatus in accordance to the detected movement of the control part.

BRIEF DESCRIPTION OF THE DRAWINGS

For a more complete understanding of example embodiments of the present invention, reference is now made to the following descriptions taken in connection with the accompanying drawings.

An example embodiment of the present invention and its potential advantages are best understood by referring to FIGS. 1 through 7 of the drawings.

FIG. 1 describes an example apparatus according to an embodiment of the invention.

FIG. 2 describes another example apparatus according to an embodiment of the invention.

FIG. 3 describes a further example apparatus according to an embodiment of the invention.

FIG. 4 describes an example of an apparatus according to an embodiment of the invention.

FIG. 5 describes a flow chart according to an example embodiment of the invention.

DETAILED DESCRIPTION OF THE DRAWINGS

Figure 6:
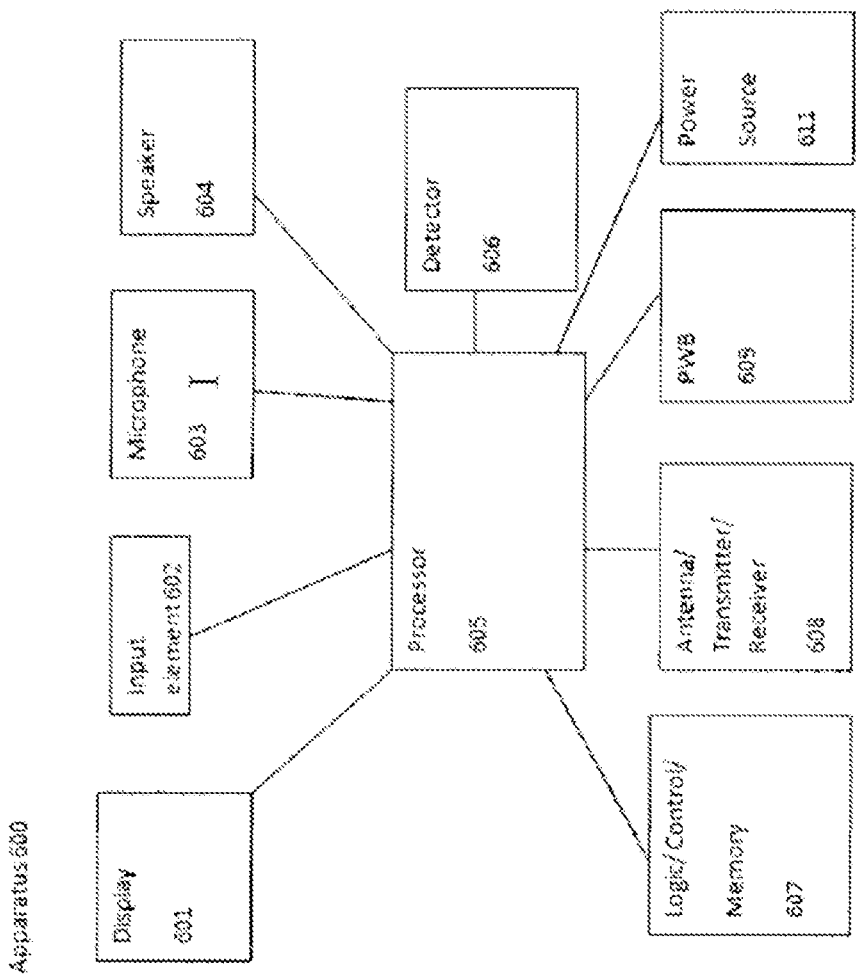
FIG. 6 describes an example of an apparatus according to an embodiment of the invention.

FIG. 1 describes an example apparatus according to an embodiment of the invention. The apparatus 100 comprises a housing part 102. The housing part 102 comprises a front surface 103. The apparatus 100 comprises a control part 104. The control part 104 comprises a front surface 105. In this example embodiment of FIG. 1, the front surface 103 of the housing part 102 and front surface 105 of the control part 104 are next to each other. The front surfaces 103, 105 are adjacent and in parallel. In this example embodiment of FIG. 1 the front surface 103 of the housing part 102 and front surface 105 of the control part 104 form unitary front plane of the apparatus 100. In the example embodiment of FIG. 1, the housing part 102 and the control part 104 are stabile in relation with each other. In the example embodiment of FIG. 1, the housing part 102 and the control part 104 are in a rest position in which the housing part 102 and the control part 400 are not moved relative to each other. The housing part 102 and the control part 104 are configured to form a relatively unitary structure when being stabile in relation with each other. Said housing part 102 and said control part 104 are configured to be moveable in relation with each other.

According to an example embodiment, the housing part 102 and the control part 104 are configured to be coupled mechanically via a mechanical coupling. In an example embodiment, the housing part 102 and the control part 104 are configured to be coupled mechanically via a rigid coupling. In an example embodiment, the housing 102 and control part 104 are configured to be coupled mechanically via an elastic coupling. The mechanical coupling may be implemented using a hinge, a joint, a ball joint, or elastic joint, for example. In an example embodiment the housing part 102 and the control part 104 are configured to be coupled electrically via an electric connection. The electric connection may be a wired connection, or a wireless connection. The wireless connection may comprise infrared, Bluetooth, radio frequency identification (RF ID) or any sensors capable of detecting position. According to another example embodiment the housing part 102 and the control part 104 may be configured to be coupled both mechanically and electronically.

A housing part 102 and a control part 104 may be coupled via coupling means. The coupling means may comprise mechanical and/or electrical coupling means. The coupling means may be rigid or elastic. The mechanical coupling means may comprise a hinge, a joint, a ball joint or elastic joining means, for example. The electrical coupling means for providing an electrical connection may comprise a wired connection means or a wireless connection means. The wireless connection means may comprise infrared, Bluetooth, radio frequency identification (RF ID) or means for detecting position, like a sensor.

FIG. 2 describes another example apparatus according to an embodiment of the invention. An arrow 20 describes X movement. The control part 204 and the housing part 202 are configured to be movable in relation to each others. The control part 204 is configured to be moved in at least one dimension in relation to the housing part 202; or vice versa. The at least one dimension of movement comprises at least two directions of movement. In FIG. 2 the front face of the apparatus 200 comprises front face 203 of the housing part 202 and front face 205 of the control part 204. In a stable rest position the the front face 203 of the housing part 202 and the front face 205 of the control part 204 may be in parallel, in substantially same plane, forming substantially unitary surface. In the rest position the front face of the apparatus 200 may comprise substantially rectangular shape or dimensions. In FIG. 2 the control part 204 is moved in relation to the housing part 202. In the example embodiment of FIG. 2 the control part 204 is substantially rectangular. The control part comprises short sides 205a, 205b, and long sides 205c, 205d. One of the long sides 205d of the control part 204 is next to a shorter side of a substantially rectangular housing part 202. In this example, at least one short side 205a, 205b of the control part 202 is moveable such that it may be upper or lower than the front face 203 plane of the housing part 202. In FIG. 2 the front face 205 of the control part 204 is upper at its one end 205b and lower at its other end 205a compared to the plane of the front face 203 of the housing part 202.

In the example of FIG. 2, the housing part 202 and the control part 204 are side by side, coupled at substantially mid part of the side placed against to the other part. In this case the mid portion of the control part 204 and the housing part 202 maintain substantially same level in the front face of the housing. Short sides 205a, 205b, or end portions of the control part 204 are moveable such that front surface 205b of one end portion is upper and front surface 205a of the other end portion lower than the front face level of the housing part 202. While one of the end portions is upper, the other is corresponding amount lower compared to the front face level of the housing part, in this example. In another example a control part may be elastic and configured to be deformable towards the movement. The shape of the control part may be transformable in accordance to the movement. A change in shape may relate to a front face, to a control part, or to a portion of a control part.

In the example embodiment of FIG. 2 X-axis 20 proceeds along the longitudinal direction of the apparatus 200 in the middle of the apparatus 200. The control part 204 is movable around the X-axis 20. If the user is holding the apparatus 200 such that the user is facing the housing part 202, for example looking at it, the movement around X-axis 20 comprises movement back and forth, towards and away from the user. In this example embodiment, the front surface 205 of the control part 204 is configured to be turntable around X-axis 20 and in relation with the front surface 203 of the housing part 202.

In the example of FIG. 2 the control part 204 is turnable along the X-axis 20 in two directions thereby revealing a part of a side of the housing part 202. In another example embodiment, the housing part 202 and the control part 204 may be coupled at one end of their parallel sides. A short side 205a of a control part 204 may be coupled to a longer side of a housing part, at the end portion of their common side. In this case, the coupling portion, which substantially maintains the same level in the front face of the control part with the front face of the housing part, is situated at one end part 205a of the control part. The other end of the control part 205b is unconnected and freely moveable according to force influencing it. The free end of the control portion has the widest path of movement in this example.

According to further embodiment an elastic coupling is configured to moveably connect the housing part 202 and the control part 204. The end of the housing part is not revealed. The housing part 202 and the control part 204 may be coupled via elastic portion which is configured to deformate according to movement of portions. An elastic connection may be configured to adapt the change, and configured to return its original shape and/or position, when no force has effect on it. While the elastic portion returns its original shape, the housing returns to its rest position. Freedom(s) of movement with the elastic connection may be as in some or all of the other illustrated examples and/or embodiments.

The control part 204 may be moved around the X-axis 20 and in relation to the point or area of coupling. The control part 204 and the housing part 202 may have different relative positions until an extreme position has been reached. After having reached the extreme position in the first position, for example backwards from the plane of the front face of the housing part, the control part 204 may be moved towards the second position, for example forwards from the plane of the front face of the housing part. The control part 204 may be stopped at any relative position in relation to the housing part 202 before reaching any of its extreme position(s). The control part 204 may be freely moved between any relative position towards any of its extreme position(s), without reaching its extreme position(s). An external force may be directed towards the control part 204 to evoke the movement. The control part 204 may be flexibly, accurately moveable.

The housing part 202 and the control part may be coupled substantially in the middle of their common side or perimeter. In another example embodiment, the parts may be coupled at any point or portion along their common side or perimeter. According to another example embodiment, the parts may be coupled along their common side. The parts may have one common side, or share a side facing the other part. The coupling may be realized via a flexible, stretchable coupling. The coupling may be made from a flexible, deformable, reversible substance, for example but not limited to, a rubber, rubber like substance, silicon, nano substance, a flex, a thermoplastic substance.

A housing part and a control part may be coupled via coupling means. Coupling means may comprise a flexible and/or stretchable, reversible and/or deformable coupling means. The coupling means may be made of rubber or a rubber like substance, silicon, nano substance, a flex or a thermoplastic substance, for example.

FIG. 3 describes a further example apparatus according to an embodiment of the invention. An arrow 30 describes direction of movement according to this embodiment. The apparatus 300 comprises a housing part 302 and the control part 304. The control part 304 is configured to be moveable in relation with the housing part 302. The control part 304 is configured to be moved in at least one dimension. The dimension comprises at least two directions of movement. The at least two directions of movement are movements towards the front face 303 of the housing part 302 and away from the front face 303 of the housing part 302. The apparatus 300 comprises substantially rectangular outer dimensions. In this example embodiment, a long side 305c of a substantially rectangular control part 304 is moveable towards or away from the front face plane of the housing part 302.

An Y-axis 30 comprises an axis along the front face of the apparatus 300, along the common side of the housing part 302 and the control part 304. The Y-axis 30 extend along long side of the control part 304, which is opposite to the outer long side 305c of the substantially rectangular control part 304. In this example embodiment, the the front surface 305 of the control part 304 is configured to be moveable towards the front surface 303 of the housing part 302 and away from the front face plane of the housing part 302 around Y-axis. If user is facing the front face 303, for example looking at it, the movement may be towards the user or away from the user. In this example embodiment the movement of the long side of the control part 305c, which is opposite with the common side with the housing part, may be upwards or downwards from the front surface plane of the housing part 302. The long edge 305c of the control part 304 is configured to be turnable towards the housing part 302 and away from the front surface 303 of the housing part 302. In FIG. 2 the front surface 303 of the housing part 302 and the front surface 305 of the control part 304 are configured to move towards each other.

The housing part 302 and the control part 304 may be coupled via a junction in the middle of their common side or perimeter. In another example embodiment, the housing part 302 and the control part 304 may be coupled via a junction at any point along the common perimeter between the front surface 303 and the front surface 305. According to another example embodiment the housing part 302 and the control part 304 may be coupled along their common side. The coupling may be flexible, stretchable, reversible, or any of previous. The coupling means may comprise, or the coupling may be made using a flexible, stretchable, material for example but not limited to a rubber, rubber like material or substance, silicon, nano material or substance, a flex, thermoplastic material or substance. The combination may be rigid, made from a rigid material or substance, for example but not limited to plastic, ceramic, steel.

FIG. 4 describes an example of an apparatus according to an embodiment of the invention. Two arrows 40, 50 describe directions of movement. The control part 404 is configured to be moved in at least two dimensions and both the two dimensions comprise at least two directions of movement. The moving in at least two dimensions may comprise that the front surface 403 of the housing part 402 and the front surface 405 of the control part 404 are configured to move away from each other or towards each other, as in example embodiments of FIG. 2 and/or FIG. 3. At least one short side 405b or 405 a of the control part 404 is moveable towards or away from front housing surface 403 of the housing part 402. The long side 405c of the control part 404, which is opposite of the common side 405d with the short side of the substantially rectangular housing part 402, is moveable towards or away from the front housing surface 403 of the housing part 402. The movement of the control part 404 may comprise movement towards the dimensions of movement simultaneously. According to some example embodiments, the control part 404 is moveable steplessly at the both dimensions. The control part 404 may be moveable towards corner parts of the substantially rectangular housing part 402. Freedom of movement may allow any portion or point of the housing part 402 to be pointed or directed to using the control part 404.

In an example, the housing part comprises a display. For example during a rally game application run at the display, when a long side 405c of the control part 404 is turned towards the housing part 402, a car moving in a display of the housing part 402 is configured to be guided towards the movement of the control part 404, being the corresponding (left) side on the display. When a long side 405c of the control part 404 is turned away from the housing part 402, a car moving in a display of the housing part 402 is configured to be guided towards the movement of the control part 404, being the corresponding (right) side on the display. Similarly, a moving object in the display of the housing part 402 may be directed towards corners, or any other direction along the display, by corresponding movement of the control part 404. The corresponding movement of the control part 404 may comprise a simultaneous movement in both Y and X directions. The simultaneous movement may comprise movement in between extreme positions of the control part 404 in both Y and X directions. The control part 404 may be configured to control other features of the housing part application than direction of movement. For example, when the control part 404 is turned towards a first position, speed of a moving object may be configured to be increased. When the control part 404 is turned towards a second position, the speed of a moving object may be configured to be decreased. Any feature, character, attribute or property of the housing part 402, or application run on the housing part 402 may be configured to be controlled using the control part 404.

In an example embodiment, movement of the control part is configured to be in between the extreme positions. The extreme positions or end points of movement form a degree of freedom of movement. Any position between the extreme positions is allowed, thus comprised in the degree of freedom of movement. For example movement along X- and/or Y-axis, as described in previous, may be, but is not limited to 45 degrees along the axis X and Y. The degree of freedom of the movement may be same for the directions (x, y) or it may differ among them. Degree of freedom of the movement may depend on construction of an apparatus, or on an application run on an apparatus. In the example embodiment, the movement may only reach the extreme positions, along axis X and Y in this example. In an example embodiment, the movement along axis X and Y may comprise rotating the control part along axis X and Y, either one at a time, or simultaneously to both, in any degree of freedom of movement. In some or all example embodiments the control part may be freely moveable in relation to the housing part. For example a ball joint or a flexible joint may enable control part to be moveable in any direction or angle in relation to the housing part. Directions of X- and Y-axis are illustrated in figures as examples only. And for example in FIG. 4, the control part 404 may be configured to be moveable around X- and Y-axis direction at the same time. Movement of the control part may be directed towards 45 degree angle between the X- and Y-axis, or any other angle between the axis.

In one or more example embodiments, a control part and/or a housing part may comprise at least one key, for example a control key. In an example embodiment, the control part may comprise at least one key, at least one control key, a keypad, and/or a touch screen. A key, keypad and/or a touch screen may be provided for user input. User may control the apparatus, or an application running on it, using the key configured for input. In other example, a control part and/or a housing part may include input means. Input means may comprise at least one key, a keypad, touch screen or any other input means.

In an example embodiment, the housing part 102 comprises a back surface opposite to the front surface 103. The control part 104 comprises a back surface opposite to the front surface 105. A reference is made to the FIG. 1 and to the example embodiment in which the housing part 102 and the control part 104 are configured into stabile position. In this stabile position, also the back surface of the housing part 102 and the back surface of the control part 104 may be configured to form a uniform structure. According to this example embodiment, the housing part 102 and the control part 104 form a unitary surface of the apparatus 100. Thus the housing part 102 and the control part 104 have substantially similar, or close to similar width and thickness. In the example of FIG. 1 the housing part 102 and the control part 104 differ in one dimension, here at their length. The control part 104 is shorter on its front face than the housing part 102. Front face 103 of the housing part 102 may include a display and/or a user interface. User experience may be enhanced with a wide view. The control part may be shaped and dimensioned ergonomically for a user input. According to another embodiment, the housing part and the control part may have close to similar size. In further example embodiment, the housing may be a square, or substantially a square, for example with rounded edges. The control part next to it may correspond to side of the housing part at their common side, but have smaller front face. In this further example embodiment shape of the control part is substantially a rectangular. The common side of the control and housing parts need not have the same width or thickness. In one example, the housing part is substantially round or oval, and the control part coupled next to may have substantially crescent shape. In further embodiments, there may be two control parts, on two sides of the housing part. The housing part and the control part may comprise different forms depending on the construction of the apparatus, use of apparatus, desired user experience, or any other factor, relating to manufacturing, for example.

In an example embodiment, the housing part comprises user interface. The user interface is configured to show information to the user. The user interface is configured to provide the user a way to interact with the apparatus. Examples of the interaction comprises but are not limited to using the control part as an input, that may comprise typing a message by moving the control part and selecting a letter shown on the display; and/or selecting an application to be run in the apparatus. Another example of the interaction comprises controlling the housing part by moving the control part; for example navigation application running in the apparatus, or a gaming application running in the apparatus. The control part may be used for example for activating an application in the apparatus or ending an application in the apparatus. Further the control part may be used for controlling different functions of the apparatus, like volume and/or illumination. In some or all of the example embodiments the control part provides a user friendly way to control the apparatus and/or different functions of the apparatus. For example it is user-friendly to take a new apparatus into use, when the control part may be used as the main control for the apparatus. Use of the control part according to one or more example embodiments may be self-explanatory to the user. This may avoid or limit any need of separate instructions. The user may learn to use the control part only. According to embodiments, this may provide simple, easy to adapt input mean for the user. According to certain embodiments, the user doesn't have to learn the use or functions of any other key or input. The one/or more embodiments may be convenient and cost efficient for a manufacturer. Gaming experience may be easy for a user with only a little skills or earlier experience in gaming, because controlling a game is simple: moving the control part corresponding to the movement of a moving object. The gaming experience may be easy and fun for a user with good skills in gaming as well: moving the control part steplessly via connection with several degrees of freedom. One or more examples may create nice gaming experience with a feeling that the user is in control and able to for example steer during the game by using small movements when moving the control part. The user may move between different applications in the apparatus by zooming the applications closer which are more of interest to the user. The user may browse pictures in the apparatus and zoom the pictures which are more interest to the user and provide a closer viewing opportunity. The user may take a picture by turning the control part. In one or more example embodiments, the control part is configured to control the user interface or the application(s) of the housing part.

In an example embodiment, the control part comprises input means and the control part is configured to provide input via movement through electrical connection. The housing part and the control part are configured to be connected with each other via electrical flexe(s), which are configured to transfer electrical signals between the housing part and the control part. The input provided by the control part, may be received in the housing part and converted as an input for the housing part.

In an example embodiment, the movement of the control part in relation to the housing part is configured to be detected by a detector. In another example embodiment, an absolute movement of the whole apparatus is configured to be detected by a detector. The detector, or detecting means, may be one of the following but not limited to a gyroscope, an accelerometer, a mechanical ball mouse, an optical sensor, a pressure sensor, a micro switch, a piezo electric switch. In an example embodiment, the number of detectors in the apparatus is more than one, for example two. The two detectors may be implemented one in the housing part, one in the control part. The location of the detector may vary in that the the detector may be implemented in the housing part or the detector may be implemented in the control part. The detected movement is configured to be processed as an input signal by a processor in an apparatus. The processor may be one of the following but not limited to: Central Processing Unit (CPU), Microprocessor, Digital Signal Processor. The input signal is configured to be transmitted to, or detected by, the housing part. The input signal may be configured to generate a change on a display of the housing part, for example an update and/or an input. The converted signal may be transmitted to a display circuit to be displayed on a display of the housing part. The movement of the control part may be transferred to. and/or detected by, a housing part. The movement of an object in a display may further provide a sense feedback to the user. For example during gaming, a certain input, or a mode of an application, or an event in a display may be configured to generate a feedback signal, sent back and to be realized providing feedback to the user. By a sense feedback the user may get more immersive or embedded feeling of the application or use of an apparatus.

FIG. 5 describes a flow chart according to an example embodiment of the invention. In this example embodiment there is provided a housing part and a control part, which are configured to be moveable in relation with each other 501. The housing part comprises a front surface and the control part comprises a front surface. The front surface of the housing part and the front surface of the control part are next to each other 502. The front surfaces may be in parallel. The front surfaces may form substantially unitary front surface for an apparatus comprising a housing part and a control part. The control part is configured to be moveable in at least one dimension in relation with said housing part 503. For example a side of a substantially rectangular control part may move in relation to the housing part. The movement and degrees of movement may be as explained in previous example embodiments of the invention. The movement of the control part in relation with the housing part is detectable 504. For example the movement is configured to be detected by a detector. The detector may be placed in the control part or in the housing part or there may be detector portion in both parts. The movement may comprise controlling said housing part 505. The movement may be used to control a function of a housing part, or an application running on a housing part.

FIG. 6 describes an example embodiment of an apparatus 600. The apparatus 600 may comprise a mobile phone, a gaming device, a music player, an internet tablet, a personal digital assistant, a computer, a navigator, a control device. The apparatus 600 may comprise a slider, a monoblock, a side slider, a clam shell, a rotating top part form factor, a swiveling top part form factor. A display 601 may provide an output, in input and/or at least part of a user interface. The display 601 may be configured to show information about functionality of the apparatus 600 to a user. The display 601 may be configured to show an application running in the apparatus 600. The display 601 may comprise a touch screen. The apparatus 600 may comprise an input element 602 for example, a mechanical keypad, touch keypad, a key, and/or the like, configured to receive user input configured to control the apparatus 600. In some embodiments there may be no separate input element 602. Printed wire board (PWB) 609 is configured to comprise at least some electrical components of the apparatus 600. Printed wire board (PWB) 609 may be configured to provide electrical connection between at least some electrical components of the apparatus 600. A power source 611, for example a battery, may be configured to provide power to the apparatus 600. A transceiver of an apparatus 600 may comprise for example an antenna/transmitter/receiver 608, configured to provide connection to a network. The transceiver may transmit and receive e.g. radio frequency (RF) signals to/from external network and/or device. The network may comprise code division multiple access (CDMA), wideband code division multiple access (WCDMA), $3^{rd}$ generation (3G), $4^{th}$ generation (4 G), global system for mobile communications (GSM), wireless local area network (WLAN). The apparatus 600 may comprise logic/control/memory 607 configured to store, organize and process information. The logic/control/memory block 607 may at least partly control internal data, operations and/or functions of the apparatus 600. A processor 605 is configured to process information. The processor 605 may execute instructions and enable operation of the apparatus 600. A speaker 604 is configured to convert audio signals into sound, and a microphone 603 is configured to receive for example pressure waves of a sound, and convert the pressure waves into electrical signals. A detector 606 is configured to detect movement in the apparatus 100. According to example embodiments, the detector 606 detects the movement of a control part in relation to a housing part.

According to embodiments of the invention, some of the apparatus portions shown in FIG. 6 may be omitted. The apparatus according to one or more embodiments may comprise processor, power source and a detector, which is configured to detect the movement of the control part in relation to the housing part. The way this specification describes the location of different components is not intended to be limited in either of the housing part or the control part, but the at least one of the components may be in at least one of the housing part and control part or both.

Figure 7:
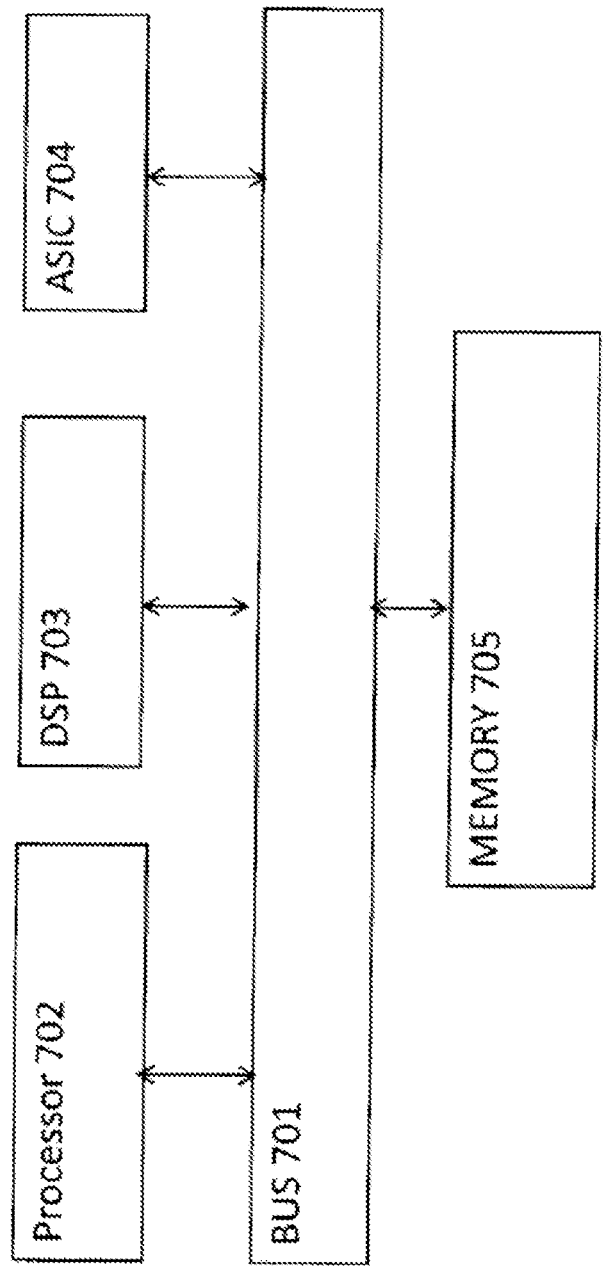
FIG. 7 describes an example of an apparatus according to an embodiment of the invention.

FIG. 7 describes an example embodiment of an apparatus 700. The apparatus 700 comprises a bus 701 configured to pass information among components in the apparatus 700. The apparatus 700 may comprise a processor 702 configured to execute instructions and process information. The apparatus 700 may comprise a processor 702 accompanied one or more digital signal processors (DSP) 703 or one or more application-specific integrated circuits (ASIC) 704 configured to process real-world signals and/or configured to perform specialized functions. The apparatus 700 may comprise a memory 705 for storing data, information and/or executable instructions, for example. The processor 702 may be configured to execute instructions and process information stored in the memory 705. In an example embodiment, controlling the apparatus comprises controlling an application configured to be run in the apparatus, or a function of the apparatus.

In an example embodiment, controlling the apparatus may comprise three dimensional moving of an object in an application configured to be run in an apparatus. The three dimensional moving in an application may be shown on a display of the apparatus. In an example embodiment, controlling the apparatus may comprise zooming in an application configured to be run in an apparatus. In an example embodiment, controlling the apparatus may comprise controlling volume and or lighting of an application running in the apparatus. In an example embodiment, controlling the apparatus may comprise controlling an application configured to be run in an apparatus. In an example embodiment, controlling the apparatus may comprise browsing an application configured to be run in the apparatus. In an example embodiment, controlling the appartus may comprise lock and un-lock the apparatus. In an example embodiment, controlling the apparatus may comprise using the movement of the control part as an input method in the apparatus.

Without in any way limiting the scope, interpretation, or application of the claims appearing below, a technical effect of one or more of the example embodiments disclosed herein may be to control an apparatus with a movement detected by the apparatus. Another technical effect of one or more of the example embodiments disclosed herein may be to enable to interact with the apparatus when an application, for example a game, is running in the apparatus. Another technical effect of one or more of the example embodiments disclosed herein may be to zoom in and out in an application running in an apparatus by moving the control part of the apparatus. Another technical effect of one or more of the example embodiments disclosed herein may be to use the control part as an input means to control the apparatus, by moving the control part in relation to the housing part of the apparatus. A further technical effect of one or more of the example embodiment may be providing a user-friendly input means for an apparatus. A yet further technical effect of one or more of the example embodiment may be providing a simple input, which may be easy to guess and straightforward to learn by a user. Another technical effect of one or more of the example embodiment may be providing easy to use, or self-explanatory input in an apparatus. A further technical effect of one or more of the example embodiment may be limited need of instructions, if any, before use. A further technical effect of one or more of the example embodiments may be more compact apparatus with less separate key parts. Another technical effect of one or more of the example embodiments may be providing more durable apparatus. A further technical effect of one or more of the example embodiments may relate to manufacturing method, for example an apparatus with less mechanical parts.

Embodiments of the present invention may be at least partly implemented in software, hardware, application logic or a combination of software, hardware and application logic. The software and/or application logic may reside on a housing part of an apparatus or a control part of an apparatus. If desired, part of the software, application logic and/or hardware may reside on the housing part, and part of the software, application logic and/or hardware may reside on the control part. The application logic, software or an instruction set is preferably maintained on any one of various conventional computer-readable media. In the context of this document, a "computer-readable medium" may be any media or means that can contain, store, communicate, propagate or transport the instructions for use by or in connection with an instruction execution system, apparatus, or device. According to one or more embodiments a computer program product comprises a computer-readable medium bearing computer program code embodied therein for use with an apparatus according to one or more previous example embodiments. The computer program code comprises code for detecting a movement of a control part of the apparatus; and code for controlling a housing part of the apparatus in accordance to the detected movement of the control part.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims. Possible reference numbers in the claims are not limiting.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. An apparatus comprising a housing part and a control part,
    said housing part and said control part are in a first position relative to one another joined by an elastic coupling, and wherein said housing part and said control part are configured to be moveable in relation with each other about a first axis extending through each of said housing part and said control part and through said elastic coupling, wherein said housing part and said control part are movable relative to one another about a second axis extending perpendicular to said first axis; and
    said housing part comprising a front surface and said control part comprising a front surface,
    wherein said front surface of said housing part and said front surface of said control part are configured substantially next to each other,
    wherein said control part is biased into the first position relative to said housing,
    wherein movement of said control part in at least one dimension relative to said housing part is associated with an input signal
    wherein rotation of said control part relative to said housing part about said first axis in a first direction is associated with a first input signal, rotation of said control part relative to said housing part about said first axis in a second direction is associated with a second input signal, rotation of said control part relative to said housing part in a first direction about said second axis is associated with a third input signal, and rotation of said control part relative to said housing part about said second axis in a second direction is associated with a fourth input signal.

2. An apparatus according to claim 1, wherein the front face of said housing part and the front face of said control part are configured to form a substantially unitary plane.

3. An apparatus according to any of claim 1, wherein said housing part and said control part comprise a common side substantially against each other, and wherein along said common side said housing part and said control part are configured to be movable in relation with each other.

4. An apparatus according to claim 3, wherein a side of said control part, which is next to the common side of said control part and said housing part, is moveable towards said front surface of said housing part and/or away from said front surface of said housing part.

5. An apparatus according to claim 3, wherein a side of said control part, which is opposite to the common a side of said control part and said housing part, is moveable towards said front surface of said housing part and/or away from said front surface of said housing part.

6. An apparatus according to claim 1, wherein said housing part and said control part are configured to be coupled at least one of mechanically or electronically.

7. An apparatus according to claim 1, wherein said housing part comprises a user interface.

8. An apparatus according to claim 1, wherein said control part is configured to control at least one of said housing part, a function of said housing part, or an application of said housing part.

9. An apparatus according to claim 1, wherein rotation of said control part relative to said housing part about said axis is associated with an input signal directed to an audio volume of an application of the apparatus.

10. An apparatus according to claim 1, wherein rotation of said control part relative to said housing part about said axis is associated with an input signal directed to an illumination level of an application of the apparatus.

11. An apparatus according to claim 1, wherein said elastic coupling between said housing part and said control part comprises a flexible, stretchable coupling.

12. An apparatus according to claim 1, wherein said first input signal, second input signal, third input signal, and fourth input signal, are each unique.

13. A method comprising
    providing a housing part and a control part,
    providing an elastic coupling between the housing part and the control part, wherein said housing part and said control part are biased into a first position relative to one another,
    providing said housing part and said control part to be moveable in relation with each other, wherein said housing part and said control part are configured to be moveable in relation with each other about a first axis extending through each of said housing part and said control part and through said elastic coupling, wherein said housing part and said control part are movable relative to one another about a second axis extending perpendicular to said first axis,
    providing a front surface of said housing part and a front surface of said control part substantially next to each other,
    providing said control part to be movable in at least one dimensions in relation with said housing part in response to application of a first force, and
    providing said control part to be returned to the first position relative to said housing part in response to removal of the first force,
    wherein rotation of said control part relative to said housing part about said first axis in a first direction is associated with a first input signal, rotation of said control part relative to said housing part about said first axis in a second direction is associated with a second input signal, rotation of said control part relative to said housing part in a first direction about said second axis is associated with a third input signal, and rotation of said control part relative to said housing part about said second axis in a second direction is associated with a fourth input signal.

14. A method according to claim 13, further providing detecting, movement of the control part in relation with the housing part.

15. A method according to claim 13, wherein said first input signal comprises an input signal to an application provided for display on said housing part.

16. A computer program product, comprising at least one non-transitory computer-readable storage medium having computer-executable program code portions stored therein, the computer-executable program code portions comprising:

program code instructions for detecting movement of a control part of an apparatus from a first position relative to a housing part to a second position relative to said housing part, wherein movement of a control part of the apparatus can be detected about a first axis extending through each of said housing part and said control part and through said elastic coupling and about a second axis extending perpendicular to said first axis, program code instructions for providing an input signal to said housing part of the apparatus in accordance to the detected movement of the control part, wherein rotation of said control part relative to said housing part about said first axis in a first direction is associated with a first input signal, rotation of said control part relative to said housing part about said first axis in a second direction is associated with a second input signal, rotation of said control part relative to said housing part in a first direction about said second axis is associated with a third input signal, and rotation of said control part relative to said housing part about said second axis in a second direction is associated with a fourth input signal, and program code instructions for providing another input signal to said housing part of the apparatus in accordance to the detected movement in response to determining that said control part of the apparatus remains in the second position relative to said housing part.

* * * * *